US012121161B1

(12) United States Patent
Bledsoe

(10) Patent No.: US 12,121,161 B1
(45) Date of Patent: *Oct. 22, 2024

(54) COLLECTABLE SHELF SYSTEM

(71) Applicant: Dustin Bledsoe, Mount Airy, NC (US)

(72) Inventor: Dustin Bledsoe, Mount Airy, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/505,198

(22) Filed: Nov. 9, 2023

Related U.S. Application Data

(63) Continuation of application No. 17/867,897, filed on Jul. 19, 2022, and a continuation of application No. 17/867,907, filed on Jul. 19, 2022, now Pat. No. 11,871,858.

(51) Int. Cl.
A47F 5/00 (2006.01)
F16B 1/00 (2006.01)

(52) U.S. Cl.
CPC .............. A47F 5/0068 (2013.01); F16B 1/00 (2013.01); F16B 2200/83 (2023.08)

(58) Field of Classification Search
CPC .. A47F 5/0068; A47F 5/00; A47F 5/10; A47F 5/112; A47F 5/11; A47F 5/14; A47F 5/0043; A63H 3/50; A47B 43/02; A47B 96/027
USPC ...................................................... 108/27, 92
See application file for complete search history.

(56) References Cited

U.S. PATENT DOCUMENTS

| | | | | |
|---|---|---|---|---|
| 297,219 A * | 4/1884 | Anthony | ............... | A47B 23/002 108/166 |
| 1,422,529 A * | 7/1922 | Bingaman | ................. | A47F 5/11 40/312 |
| 1,790,487 A * | 1/1931 | Ruhnau | ................ | A47B 23/042 248/448 |
| 1,927,028 A * | 9/1933 | Haas | ........................ | A47F 5/112 428/12 |
| 2,149,978 A * | 3/1939 | Noel | ......................... | G09F 7/00 248/459 |
| 2,347,041 A * | 4/1944 | Filsinger | ................. | B44F 11/00 D7/610 |
| 2,391,285 A * | 12/1945 | Williamson | ............ | A47F 5/112 D6/310 |
| 2,615,583 A * | 10/1952 | Johnson | .................... | A47F 5/04 D11/118 |
| 2,639,040 A * | 5/1953 | Tapley | ................... | A47F 5/0068 211/119.003 |
| 2,736,131 A * | 2/1956 | Lewis, Jr. | ................. | A63H 3/50 5/503.1 |
| 3,012,348 A * | 12/1961 | Smith | ...................... | B42F 17/08 312/193 |
| 4,365,720 A * | 12/1982 | Kaneshiro | .............. | B25H 3/006 211/73 |
| 4,395,056 A * | 7/1983 | Sferragatta | ............ | B42D 5/006 281/31 |
| 4,852,498 A * | 8/1989 | Judd | ..................... | A47B 23/043 190/11 |

(Continued)

Primary Examiner — Jose V Chen
(74) Attorney, Agent, or Firm — Kyle A. Fletcher, Esq.

(57) ABSTRACT

The collectable shelf system is a display. The collectable shelf system is configured for use with a comic book. The collectable shelf system is configured for use with a hero figurine. The collectable shelf display incorporates a book mount and a figurine shelf. The book mount attaches to the figurine shelf. The book mount displays the comic book. The figurine shelf presents the hero figurine. The hero figurine is a character that is associated with the comic book.

12 Claims, 4 Drawing Sheets

(56) References Cited

U.S. PATENT DOCUMENTS

| | | | | |
|---|---|---|---|---|
| 5,042,768 A | * | 8/1991 | Goldstein | G09F 3/204 |
| | | | | 248/223.41 |
| 5,413,228 A | * | 5/1995 | Le Clerc | A63B 71/0045 |
| | | | | D6/552 |
| 6,389,991 B1 | * | 5/2002 | Morrisson | A47B 57/585 |
| | | | | 211/184 |
| 6,811,006 B1 | * | 11/2004 | Mundle | A45C 13/02 |
| | | | | 190/18 R |
| 8,376,299 B2 | * | 2/2013 | Burkman | A47G 1/16 |
| | | | | 248/248 |
| 8,474,781 B2 | * | 7/2013 | Deguglimo | A47F 5/0068 |
| | | | | 340/568.1 |
| 9,380,847 B1 | * | 7/2016 | Killebrew | A45C 9/00 |
| 11,761,576 B1 | * | 9/2023 | Bryner | A47B 23/044 |
| | | | | 108/9 |
| 11,871,858 B1 | * | 1/2024 | Bledsoe | A47F 5/0068 |
| 2004/0211741 A1 | * | 10/2004 | Bustos | A47F 5/0037 |
| | | | | 211/187 |
| 2005/0199566 A1 | * | 9/2005 | Sudholt | A47F 7/0007 |
| | | | | 211/85.29 |
| 2011/0269339 A1 | * | 11/2011 | Baran | H05K 7/1474 |
| | | | | 439/532 |
| 2011/0277671 A1 | * | 11/2011 | Pryor | A47B 87/002 |
| | | | | 108/25 |
| 2016/0120303 A1 | * | 5/2016 | Constantino | F16M 11/2014 |
| | | | | 248/124.2 |
| 2018/0098452 A1 | * | 4/2018 | Baker | H05K 7/183 |

* cited by examiner

COLLECTABLE SHELF SYSTEM

CROSS REFERENCES TO RELATED APPLICATIONS

This non-provisional patent claims priority to U.S. non-provisional patent application Ser. No. 17/867,897 that was filed by the applicant on Jul. 19, 2022, as well as U.S. non-provisional patent application Ser. No. 17/867,907 that was filed by the applicant on Jul. 19, 2022.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of display shelves characterized by their constructional features. (A47F5/00)

SUMMARY OF INVENTION

The collectable shelf system is a display. The collectable shelf system is configured for use with a comic book. The collectable shelf system is configured for use with a hero figurine. The collectable shelf display comprises a book mount and a figurine shelf. The book mount attaches to the figurine shelf. The book mount displays the comic book. The figurine shelf presents the hero figurine. The hero figurine is a character that is associated with the comic book.

These together with additional objects, features and advantages of the collectable shelf system will be readily apparent to those of ordinary skill in the art upon reading the following detailed description of the presently preferred, but nonetheless illustrative, embodiments when taken in conjunction with the accompanying drawings.

In this respect, before explaining the current embodiments of the collectable shelf system in detail, it is to be understood that the collectable shelf system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the collectable shelf system.

It is therefore important that the claims be regarded as including such equivalent construction insofar as they do not depart from the spirit and scope of the collectable shelf system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
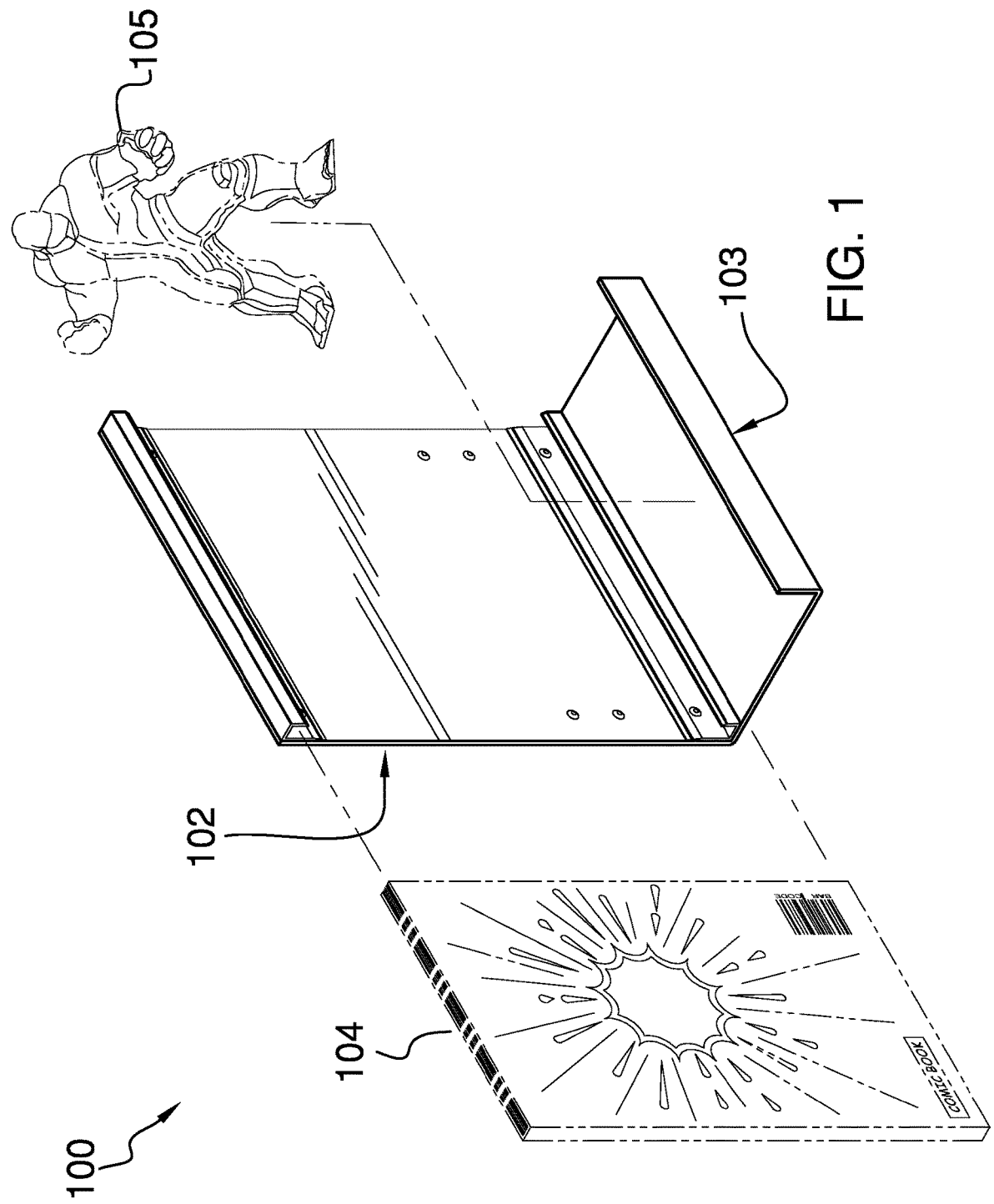
FIG. 1 is a perspective view of an embodiment of the disclosure.
Figure 2:
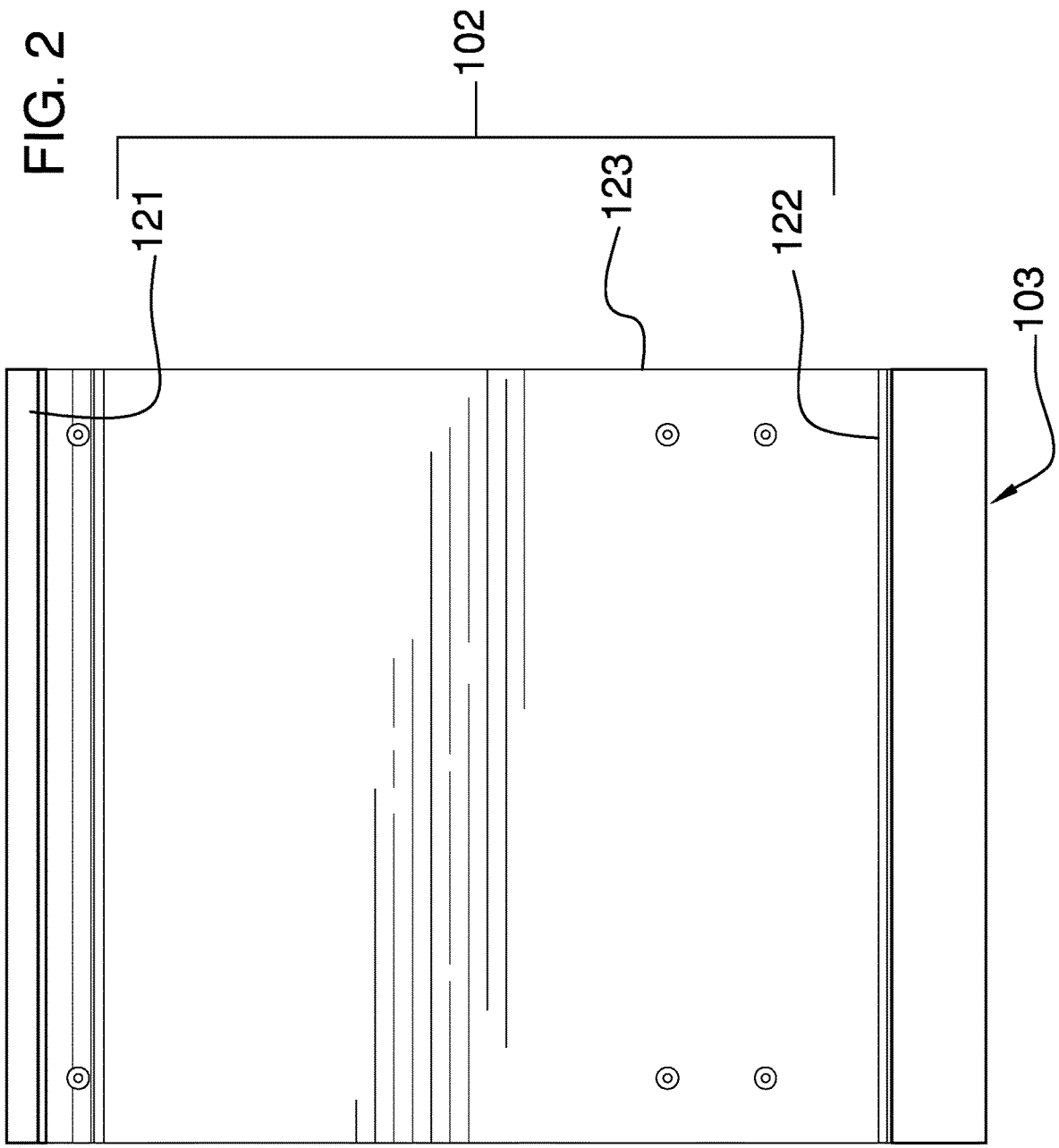
FIG. 2 is a front view of an embodiment of the disclosure.
Figure 3:
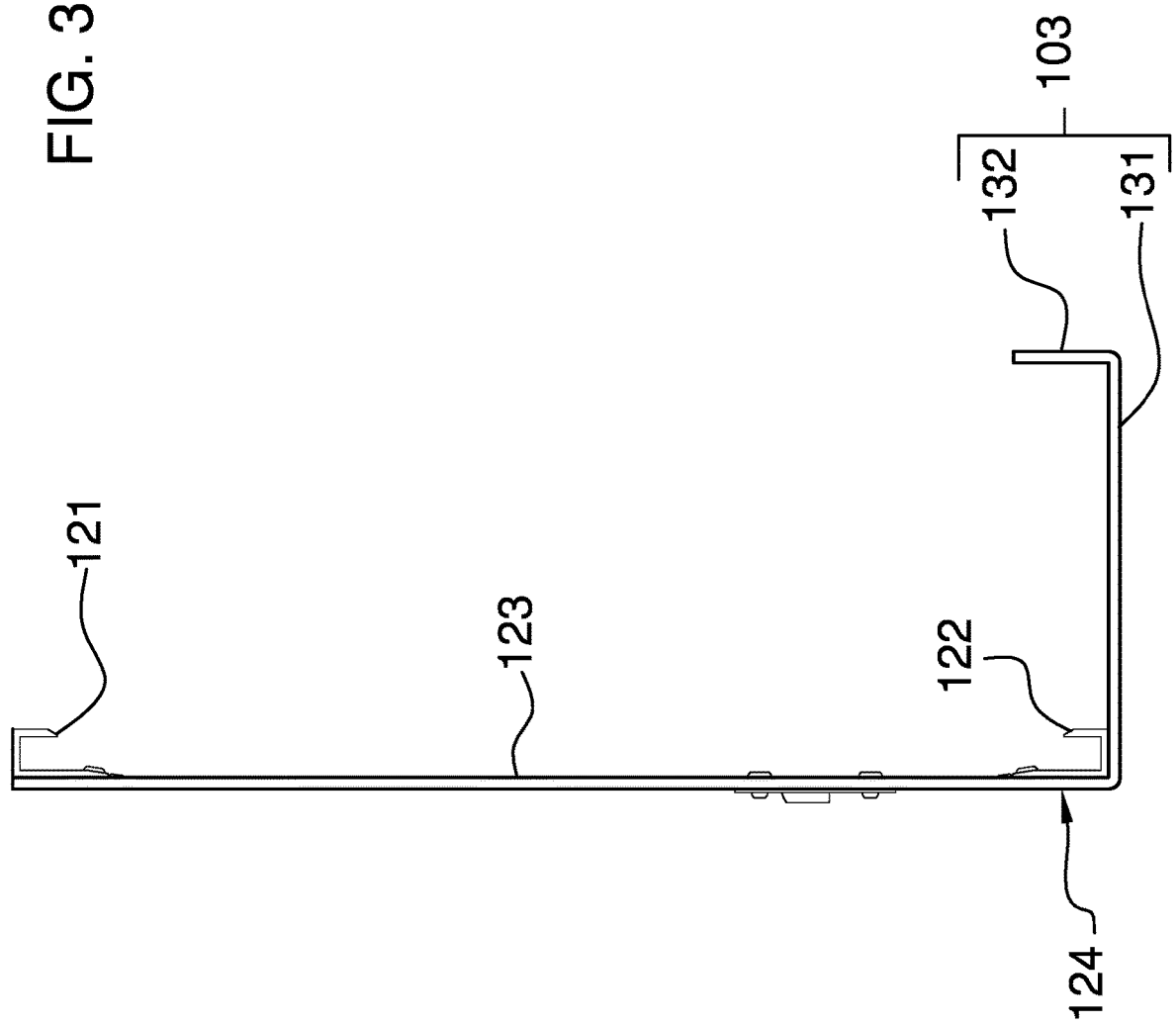
FIG. 3 is a side view of an embodiment of the disclosure.
Figure 4:
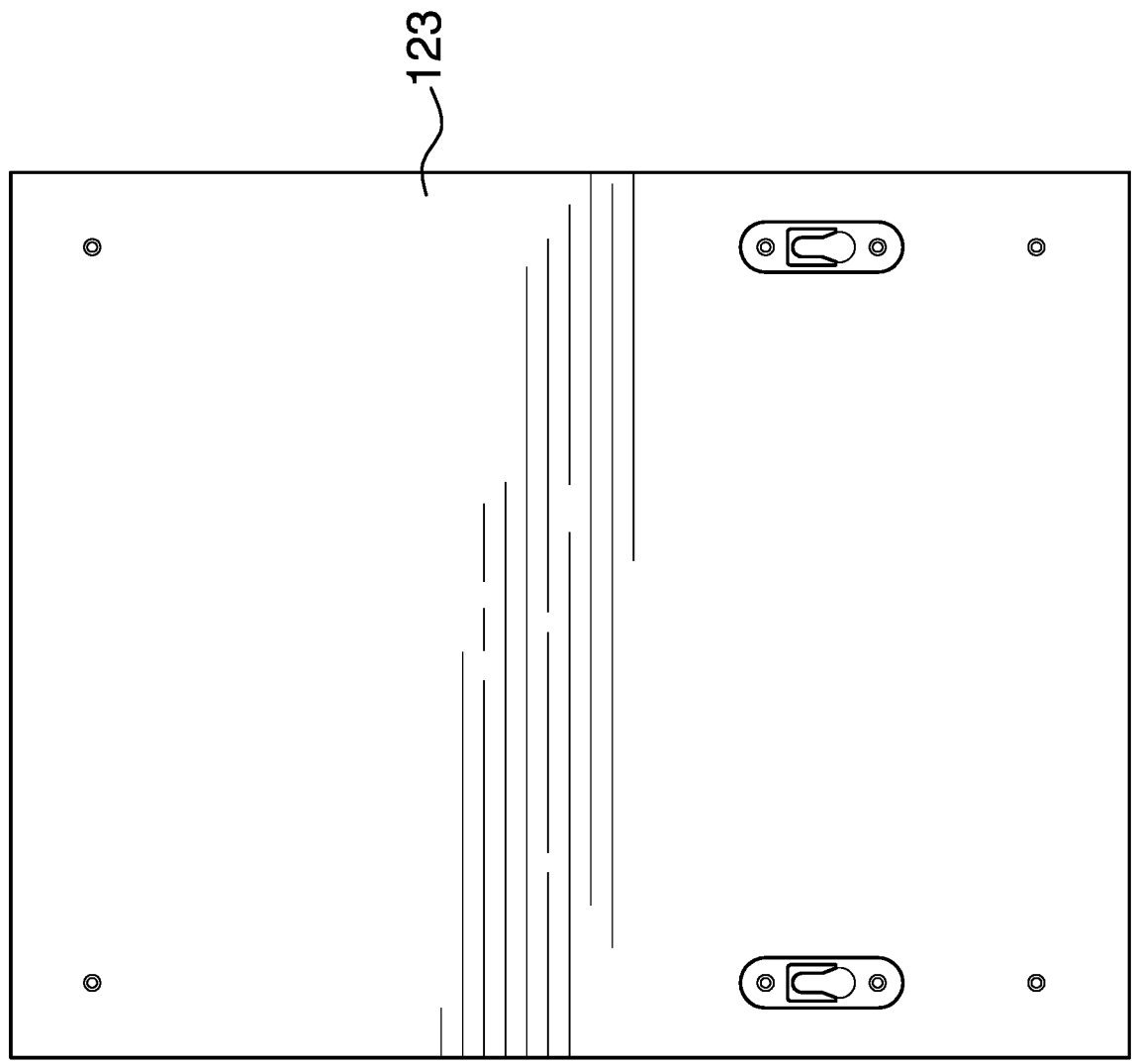
FIG. 4 is a rear view of an embodiment of the disclosure.

Detailed reference will now be made to one or more potential embodiments of the disclosure, which are illustrated in FIGS. 1 through 4.

The collectable shelf system 100 (hereinafter invention) is a display. The invention 100 is configured for use with a comic book 104. The invention 100 is configured for use with a hero figurine 105. The invention 100 comprises a book mount 102 and a figurine shelf 103. The book mount 102 attaches to the figurine shelf 103. The book mount 102 displays the comic book 104. The figurine shelf 103 presents the hero figurine 105. The hero figurine 105 is a character that is associated with the comic book 104.

The comic book 104 is a book. The comic book 104 is a paper based structure that presents text images and graphic images. The images present indicia used to identify a sentiment. The comic book 104 mounts in the book mount such that an image from the comic book 104 is visibly displayed. The comic book 104 removably attaches to the book mount 102.

The hero figurine 105 is a figurine. The hero figurine 105 is a three dimensional structure that identifies a sentiment. The sentiment identified by the hero figurine 105 is associated with the comic book 104. The hero figurine 105 mounts on the figurine shelf 103.

The book mount 102 is a mechanical structure. The book mount 102 forms a display. The book mount 102 displays the comic book 104. The comic book 104 removably attaches to the book mount 102. The book mount 102 elevates the comic book 104 above a supporting surface. The book mount 102 comprises a superior horizontal mount 121, an inferior horizontal mount 122, an image plate 123, and a shelf mount 124.

The superior horizontal mount 121 is a fastening device. The superior horizontal mount 121 is a horizontally oriented structure. The superior horizontal mount 121 attaches to the image plate 123. The superior horizontal mount 121 removably secures the comic book 104 to the image plate 123. The superior horizontal mount 121 is a u-shaped structure. The superior horizontal mount 121 attaches to the superior edge of the perimeter of the image plate 123. The superior horizontal mount 121 attaches to the image plate 123 such that the comic book 104 is positioned between the superior horizontal mount 121 and the image plate 123 when the superior horizontal mount 121 secures the comic book 104 to the image plate 123.

The inferior horizontal mount 122 is a fastening device. The inferior horizontal mount 122 is a horizontally oriented structure. The inferior horizontal mount 122 attaches to the image plate 123. The inferior horizontal mount 122 removably secures the comic book 104 to the image plate 123. The inferior horizontal mount 122 is a u-shaped structure. The inferior horizontal mount 122 attaches to the inferior edge of the perimeter of the image plate 123. The inferior horizontal mount 122 attaches to the image plate 123 such that the comic book 104 is positioned between the inferior horizontal mount 122 and the image plate 123 when the inferior horizontal mount 122 secures the comic book 104 to the image plate 123. The inferior horizontal mount 122 forms the load bearing structure that elevates the comic book above a supporting surface.

The image plate 123 is a disk shaped structure. The image plate 123 attaches to the shelf mount 124. The superior horizontal mount 121 attaches to the image plate 123. The inferior horizontal mount 122 attaches to the image plate 123. The image plate 123 transfers the loads of the superior horizontal mount 121 and the inferior horizontal mount 122 to the shelf mount 124. The comic book 104 mounts against the image plate 123 such that the comic book 104 is visibly displayed.

The shelf mount 124 is a load bearing structure. The shelf mount 124 attaches to the inferior edge of the image plate 123 to the figurine shelf 103. The shelf mount 124 attaches to a vertically oriented surface. The shelf mount 124 transfers the loads of the book mount 102, the figurine shelf 103, the comic book 104, and the hero figurine 105 to the vertically oriented surface.

The figurine shelf 103 is a disk shaped structure. The figurine shelf 103 is an undercut ledge. The figurine shelf 103 is a load bearing structure. The figurine shelf 103 forms a platform that displays the hero figurine 105. The hero figurine removably anchors to the figurine shelf 103. The figurine shelf 103 elevates the hero figurine 105 above a supporting surface. The figurine shelf 103 transfers the load of the hero figurine 105 to the shelf mount 124.

The figurine shelf 103 further comprises an undercut ledge structure 131 and a parapet structure 132. The parapet structure 132 attaches to the undercut ledge structure 131. The undercut ledge structure 131 attaches the figurine shelf 103 to the shelf mount 124 of the book mount 102.

The undercut ledge structure 131 is a horizontally oriented platform. The undercut ledge structure 131 is formed as an undercut ledge. The undercut ledge structure 131 attaches to the shelf mount 124 such that the undercut ledge structure 131 projects away from the shelf mount 124 in a direction away from the vertically oriented surface. The undercut ledge structure 131 is a load bearing structure. The undercut ledge structure 131 forms the platform that elevates the hero figurine 105 above a supporting surface. The undercut ledge structure 131 transfers the loads of the hero figurine 105 and the parapet structure 132 to the shelf mount 124.

The parapet structure 132 is vertically oriented disk shaped structure. The parapet structure 132 forms a parapet. The parapet structure 132 forms a protected space that prevents the hero figurine 105 from sliding off the undercut ledge structure 131. The parapet structure 132 attaches to the edge of the perimeter of the undercut ledge structure 131 that is distal from the shelf mount 124. The parapet structure 132 projects perpendicularly away from the undercut ledge 131 in the superior direction.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Book: As used in this disclosure, a book is a paper based structure that is used to communicate information primarily through the use of written alphabetic and numeric symbols. The book is generally presented as a pad of papers that are bound together. The face (surface) of each sheet of paper in the book is referred to as a page. Stated differently, each sheet of paper in a book forms two pages within the book.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a structure that is intended to visually present an object, image, or concept to an individual.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Figurine: As used in this disclosure, a figurine is a three dimensional structure resembling (or representing) a human, animal, natural, or symbolic sentiment.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Ledge: As used in this disclosure, a ledge is a first plate structure that projects away from a second plate structure. A ledge that projects away from, or overhangs, the second plate structure in the manner of a cantilever is referred to as an undercut ledge.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Paper: As used in this disclosure, paper refers to a sheeting material commonly used as: a) a substrate on which people write; b) a substrate on which images are displayed; and, c) wrapping or covering items. Paper is typically made from plant fibers such as cellulose. Paper intended for specific purposes may be made from other materials.

Parapet: As used in this disclosure, a parapet is a vertical surface that is formed along the perimeter of a raised horizontal surface. The parapet projects away from the horizontal surface in the superior direction.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Platform: As used in this disclosure, a platform is a raised horizontal surface that forms a load path to support objects placed on the superior surface of the platform.

Present: As used in this disclosure, to present means to bring an object, image, or concept to the attention of an individual.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Puppet: As used in this disclosure, a puppet is a three-dimensional figure resembling a human, animal or symbolic image that is used for decorative, entertainment, or educational purposes. A puppet is often called a doll.

Roughly: As used in this disclosure, roughly refers to a comparison between two objects. Roughly means that the difference between one or more parameters of the two compared objects are not significantly different.

Sentiment: As used in this disclosure, a sentiment refers to a symbolic meaning or message that is communicated through the use of an object or an image, potentially including a text based image.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Shelf: As used in this disclosure, a shelf is a horizontal surface that supports one or more objects at an elevated position.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Surface: As used in this disclosure, a surface refers to a solid boundary structure that is exposed to (or adjacent to) a negative space.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall: As used in this disclosure, a wall is a vertical surface of a room or chamber.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A collectable shelf system comprising
a book mount and a figurine shelf;
wherein the book mount attaches to the figurine shelf;
wherein the collectable shelf system is configured for use with a comic book;
wherein the collectable shelf system is configured for use with a hero figurine;
wherein the book mount comprises a superior horizontal mount, an inferior horizontal mount, an image plate, and a shelf mount;
wherein the superior horizontal mount attaches to the image plate;
wherein the inferior horizontal mount attaches to the image plate;
wherein the shelf mount attaches to the image plate;
wherein the figurine shelf further comprises an undercut ledge structure and a parapet structure;
wherein the parapet structure attaches to the undercut ledge structure;
wherein the undercut ledge structure attaches the figurine shelf to the shelf mount of the book mount.

2. The collectable shelf system according to claim 1
wherein the collectable shelf system is a display;
wherein the book mount displays the comic book;
wherein the figurine shelf presents the hero figurine;
wherein the hero figurine is a character that is associated with the comic book.

3. The collectable shelf system according to claim 2
wherein the comic book mounts in the book mount such that an image from the comic book is visibly displayed;
wherein the comic book removably attaches to the book mount.

4. The collectable shelf system according to claim 3
wherein the hero figurine is a figurine;
wherein the hero figurine is a three dimensional structure that identifies a sentiment;
wherein the sentiment identified by the hero figurine is associated with the comic book;
wherein the hero figurine mounts on the figurine shelf.

5. The collectable shelf system according to claim 4
wherein the book mount is a mechanical structure;
wherein the book mount forms a display;
wherein the book mount elevates the comic book above a supporting surface.

6. The collectable shelf system according to claim 5
wherein the superior horizontal mount is a fastening device;
wherein the superior horizontal mount is a horizontally oriented structure;
wherein the superior horizontal mount attaches to the image plate;
wherein the superior horizontal mount removably secures the comic book to the image plate;
wherein the superior horizontal mount is a u-shaped structure;
wherein the superior horizontal mount attaches to the superior edge of the perimeter of the image plate;
wherein the superior horizontal mount attaches to the image plate such that the comic book is positioned between the superior horizontal mount and the image plate when the superior horizontal mount secures the comic book to the image plate.

7. The collectable shelf system according to claim 6
wherein the inferior horizontal mount is a fastening device;
wherein the inferior horizontal mount is a horizontally oriented structure;
wherein the inferior horizontal mount attaches to the image plate;
wherein the inferior horizontal mount removably secures the comic book to the image plate;
wherein the inferior horizontal mount is a u-shaped structure;
wherein the inferior horizontal mount attaches to the inferior edge of the perimeter of the image plate;
wherein the inferior horizontal mount attaches to the image plate such that the comic book is positioned between the inferior horizontal mount and the image plate when the inferior horizontal mount secures the comic book to the image plate.

8. The collectable shelf system according to claim 7
wherein the image plate is a disk shaped structure;
wherein the image plate attaches to the shelf mount;
wherein the superior horizontal mount attaches to the image plate;
wherein the inferior horizontal mount attaches to the image plate;
wherein the image plate transfers the loads of the superior horizontal mount and the inferior horizontal mount to the shelf mount.

9. The collectable shelf system according to claim 8
wherein the shelf mount is a load bearing structure;
wherein the shelf mount attaches to the inferior edge of the image plate to the figurine shelf;
wherein the shelf mount attaches to a vertically oriented surface;
wherein the shelf mount transfers the loads of the book mount, the figurine shelf, the comic book, and the hero figurine to the vertically oriented surface.

10. The collectable shelf system according to claim 9
wherein the figurine shelf is a disk shaped structure;

wherein the figurine shelf is an undercut ledge;
wherein the figurine shelf is a load bearing structure;
wherein the figurine shelf forms a platform that displays the hero figurine;
wherein the hero figurine removably anchors to the figurine shelf;
wherein the figurine shelf elevates the hero figurine above a supporting surface;
wherein the figurine shelf transfers the load of the hero figurine to the shelf mount.

11. The collectable shelf system according to claim 10
wherein the undercut ledge structure is a horizontally oriented platform;
wherein the undercut ledge structure is formed as an undercut ledge;
wherein the undercut ledge structure attaches to the shelf mount such that the undercut ledge structure projects away from the shelf mount;
wherein the undercut ledge structure is a load bearing structure;
wherein the undercut ledge structure forms the platform that elevates the hero figurine;
wherein the undercut ledge structure transfers the loads of the hero figurine and the parapet structure to the shelf mount.

12. The collectable shelf system according to claim 11
wherein the parapet structure is vertically oriented disk shaped structure;
wherein the parapet structure forms a parapet;
wherein the parapet structure forms a protected space that prevents the hero figurine from sliding off the undercut ledge structure;
wherein the parapet structure attaches to the edge of the perimeter of the undercut ledge structure that is distal from the shelf mount;
wherein the parapet structure projects perpendicularly away from the undercut ledge in the superior direction.

* * * * *